US008970427B2

(12) United States Patent
Liang et al.

(10) Patent No.: US 8,970,427 B2
(45) Date of Patent: Mar. 3, 2015

(54) PHASE-ARRAYED DEVICE AND METHOD FOR CALIBRATING THE PHASE-ARRAYED DEVICE

(75) Inventors: Chuan-Kang Liang, San Jose, CA (US); Jing-Hong Conan Zhan, Hsinchu (TW); Ti-Ku Yu, Yilan County (TW); Zhiming Deng, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 312 days.

(21) Appl. No.: 13/473,567

(22) Filed: May 16, 2012

(65) Prior Publication Data

US 2012/0293362 A1 Nov. 22, 2012

Related U.S. Application Data

(60) Provisional application No. 61/487,346, filed on May 18, 2011, provisional application No. 61/487,347, filed on May 18, 2011.

(51) Int. Cl.
*G01S 7/40* (2006.01)
*H01Q 3/26* (2006.01)

(52) U.S. Cl.
CPC ............. *H01Q 3/267* (2013.01); *H01Q 3/2605* (2013.01)
USPC ........................................................ 342/174

(58) Field of Classification Search
CPC .................................................... H01Q 3/2605
USPC .......................................................... 342/174
See application file for complete search history.

(56) References Cited

U.S. PATENT DOCUMENTS

| | | | |
|---|---|---|---|
| 4,520,361 | A | 5/1985 | Frazita |
| 4,635,062 | A | 1/1987 | Bierig |
| 5,008,844 | A | 4/1991 | Kyriakos |
| 5,173,703 | A | 12/1992 | Mangiapane |
| 5,276,452 | A | 1/1994 | Schuss |
| 5,477,229 | A | 12/1995 | Caille |
| 5,543,801 | A | 8/1996 | Shawyer |

(Continued)

FOREIGN PATENT DOCUMENTS

| | | | |
|---|---|---|---|
| CN | 1343393 | A | 4/2002 |
| CN | 1712986 | A | 12/2005 |

(Continued)

OTHER PUBLICATIONS

David R. Banbury, IEEE Radio Frequency Integrated Circuits Symposium, "A CMOS 5.5/2.4 GHz Dual-band Smart-antenna Transceiver with a Novel RF Dual-band Phase Shifter for WLAN 802.11a/b/g", 2004, 157-160, MO3C-5.

(Continued)

*Primary Examiner* — Timothy A Brainard
(74) *Attorney, Agent, or Firm* — Winston Hsu; Scott Margo

(57) ABSTRACT

A phase-arrayed device includes: a signal processing circuit arranged to generate a specific signal; a first phase-arrayed channel arranged to provide a first phase-arrayed signal according to the specific signal; a first conducting path arranged to conduct the specific signal to the first phase-arrayed channel; a second conducting path arranged to conduct the first phase-arrayed signal to the signal processing circuit; and a detecting circuit, arranged to detect a mismatch between the first phase-arrayed signal and a reference signal to generate a detecting signal utilized for calibrating the first phase-arrayed signal.

16 Claims, 8 Drawing Sheets

(56) References Cited

U.S. PATENT DOCUMENTS

| | | | | |
|---|---|---|---|---|
| 5,675,554 | A | 10/1997 | Cole | |
| 6,157,343 | A | 12/2000 | Andersson | |
| 6,204,813 | B1 | 3/2001 | Wadell | |
| 6,339,399 | B1 * | 1/2002 | Andersson et al. | 342/372 |
| 6,346,910 | B1 | 2/2002 | Ito | |
| 6,462,704 | B2 | 10/2002 | Rexberg | |
| 6,597,730 | B1 | 7/2003 | Bader | |
| 6,690,953 | B2 | 2/2004 | Rexberg | |
| 7,102,569 | B2 | 9/2006 | Tan | |
| 7,486,223 | B2 | 2/2009 | Shima | |
| 7,701,213 | B2 | 4/2010 | Graesslin | |
| 8,213,872 | B2 | 7/2012 | Lambrecht | |
| 2002/0154687 | A1 | 10/2002 | Bierly | |
| 2004/0104845 | A1 | 6/2004 | McCarthy | |
| 2004/0157646 | A1 | 8/2004 | Raleigh | |
| 2004/0219892 | A1 | 11/2004 | Vaidyanathan | |
| 2005/0113035 | A1 | 5/2005 | Kyongyop O | |
| 2005/0147192 | A1 | 7/2005 | Yamamoto | |
| 2006/0237830 | A1 | 10/2006 | Danno | |
| 2007/0047560 | A1 | 3/2007 | Tsai | |
| 2007/0099670 | A1 | 5/2007 | Naguib | |
| 2007/0104259 | A1 | 5/2007 | Herring | |
| 2007/0135168 | A1 | 6/2007 | Liu | |
| 2007/0173209 | A1 | 7/2007 | Kim | |
| 2008/0139132 | A1 | 6/2008 | Pan | |
| 2008/0274710 | A1 | 11/2008 | Li | |
| 2008/0274714 | A1 | 11/2008 | Yamaji | |
| 2009/0273517 | A1 | 11/2009 | Thiesen | |
| 2009/0290517 | A1 | 11/2009 | Rao | |
| 2010/0093282 | A1 | 4/2010 | Martikkala | |
| 2010/0099366 | A1 | 4/2010 | Sugar | |
| 2010/0164629 | A1 | 7/2010 | Behzad | |
| 2010/0261440 | A1 | 10/2010 | Corman | |
| 2011/0019723 | A1 | 1/2011 | Lerner | |
| 2011/0254754 | A1 | 10/2011 | Qi | |
| 2011/0274146 | A1 | 11/2011 | Huang | |
| 2012/0142280 | A1 | 6/2012 | Banu | |
| 2012/0294338 | A1 | 11/2012 | Zhan | |
| 2013/0156085 | A1 | 6/2013 | Nicolson | |

FOREIGN PATENT DOCUMENTS

| | | | |
|---|---|---|---|
| CN | 1751444 | A | 3/2006 |
| CN | 101212441 | A | 7/2008 |
| CN | 101582527 | A | 11/2009 |
| EP | 0 509 843 | A2 | 10/1992 |
| TW | 201249121 | | 12/2012 |
| WO | 2004025841 | A2 | 3/2004 |

OTHER PUBLICATIONS

Cameron T. Charles, IEEE Transactions on Circuits and Systems, “A Calibrated Phase and Amplitude Control System for a 1.9GHz Phased-Array Transmitter Element”, Dec. 2009, 2728-2737, vol. 56, No. 12.

* cited by examiner

PHASE-ARRAYED DEVICE AND METHOD FOR CALIBRATING THE PHASE-ARRAYED DEVICE

CROSS REFERENCE TO RELATED APPLICATIONS

This application claims the benefit of U.S. Provisional Applications Nos. 61/487,346 and 61/487,347, which were filed on 2011 May 18 and are included herein by reference.

BACKGROUND

The present invention is related to a phase-arrayed device and method for calibrating the phase-arrayed device, and more particularly to a phase-arrayed transceiver having an embedded calibrating circuit and a calibrating method thereof.

Phase-arrayed transceivers are widely used in wireless communication systems. A phase-arrayed transceiver comprises a plurality of phase array channels, wherein a typical phase array channel comprises a transmitter and a receiver. For example, when the phase-arrayed transceiver is undergoing a normal receiving operation, the plurality of receivers in the phase-arrayed transceiver can increase gain in a desired direction and reduce interference in an undesired direction. Mismatches from the process variation and the systematic skews in phase and amplitude between channels, however, reduce the gain and interference rejection capability of the phase-arrayed transceiver. Therefore, providing a low cost calibrating mechanism to calibrate mismatches between phase array channels in the phase-arrayed transceiver is an urgent problem in this field.

SUMMARY

One of the objectives of the present embodiment is to provide a phase-arrayed transceiver having an embedded calibrating circuit and a calibrating method thereof.

According to a first embodiment, a phase-arrayed device is disclosed. The phase-arrayed device comprises a signal processing circuit, a first phase-arrayed channel, a first conducting path, a second conducting path, and a detecting circuit. The signal processing circuit is arranged to generate a specific signal. The first phase-arrayed channel is arranged to provide a first phase-arrayed signal according to the specific signal. The first conducting path is arranged to conduct the specific signal to the first phase-arrayed channel. The second conducting path is arranged to conduct the first phase-arrayed signal to the signal processing circuit. The detecting circuit is arranged to detect a mismatch between the first phase-arrayed signal and a reference signal to generate a detecting signal utilized for calibrating the first phase-arrayed signal.

According to a second embodiment, a phase-arrayed device is disclosed. The phase-arrayed device comprises a signal processing circuit, a plurality of phase-arrayed channels, a plurality of first conducting circuits, a plurality of second conducting circuits, and a detecting circuit. The signal processing circuit is arranged to generate a specific signal. Each of the plurality of phase-arrayed channels has a transmitting circuit and a receiving circuit. The plurality of first conducting circuits are arranged to conduct the specific signal to the plurality of phase-arrayed channels respectively, wherein at least one of the plurality of phase-arrayed channels generates a phase-arrayed signal. The plurality of second conducting circuits are coupled to the plurality of phase-arrayed channels, respectively, and arranged to conduct the phase-arrayed signal to the signal processing circuit. The detecting circuit is arranged to detect a mismatch between the phase-arrayed signal and a reference signal to generate a detecting signal utilized for calibrating at least one of the transmitting circuits and the receiving circuits.

According to a third embodiment, a method for calibrating a phase-arrayed device is disclosed. The method comprises the steps of: sending a specific signal to a first phase-arrayed channel of a plurality of phase-arrayed channels to provide a first phase-arrayed signal; receiving the first phase-arrayed signal through a first conducting path; comparing at least one of a first phase component and a first amplitude component of the first phase-arrayed signal with at least one of a predetermined phase component and a predetermined amplitude component respectively to generate a compared result; adjusting a gain of the first phase-arrayed channel such that at least one of the first phase component and the first amplitude component of the first phase-arrayed signal substantially equal at least one of the predetermined phase component and the predetermined amplitude component, respectively, according to the compared result.

According to a fourth embodiment, a method for calibrating a phase-arrayed device is disclosed. The method comprises the steps of: sending a specific signal to a first phase-arrayed channel of a plurality of phase-arrayed channels through a first conducting path to provide a first phase-arrayed signal; receiving the first phase-arrayed signal; comparing at least one of a first phase component and a first amplitude component of the first phase-arrayed signal with at least one of a predetermined phase component and a predetermined amplitude component, respectively, to generate a compared result; adjusting a gain of the first phase-arrayed channel such that at least one of the first phase component and the first amplitude component of the first phase-arrayed signal substantially equal at least one of the predetermined phase component and the predetermined amplitude component, respectively, according to the compared result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
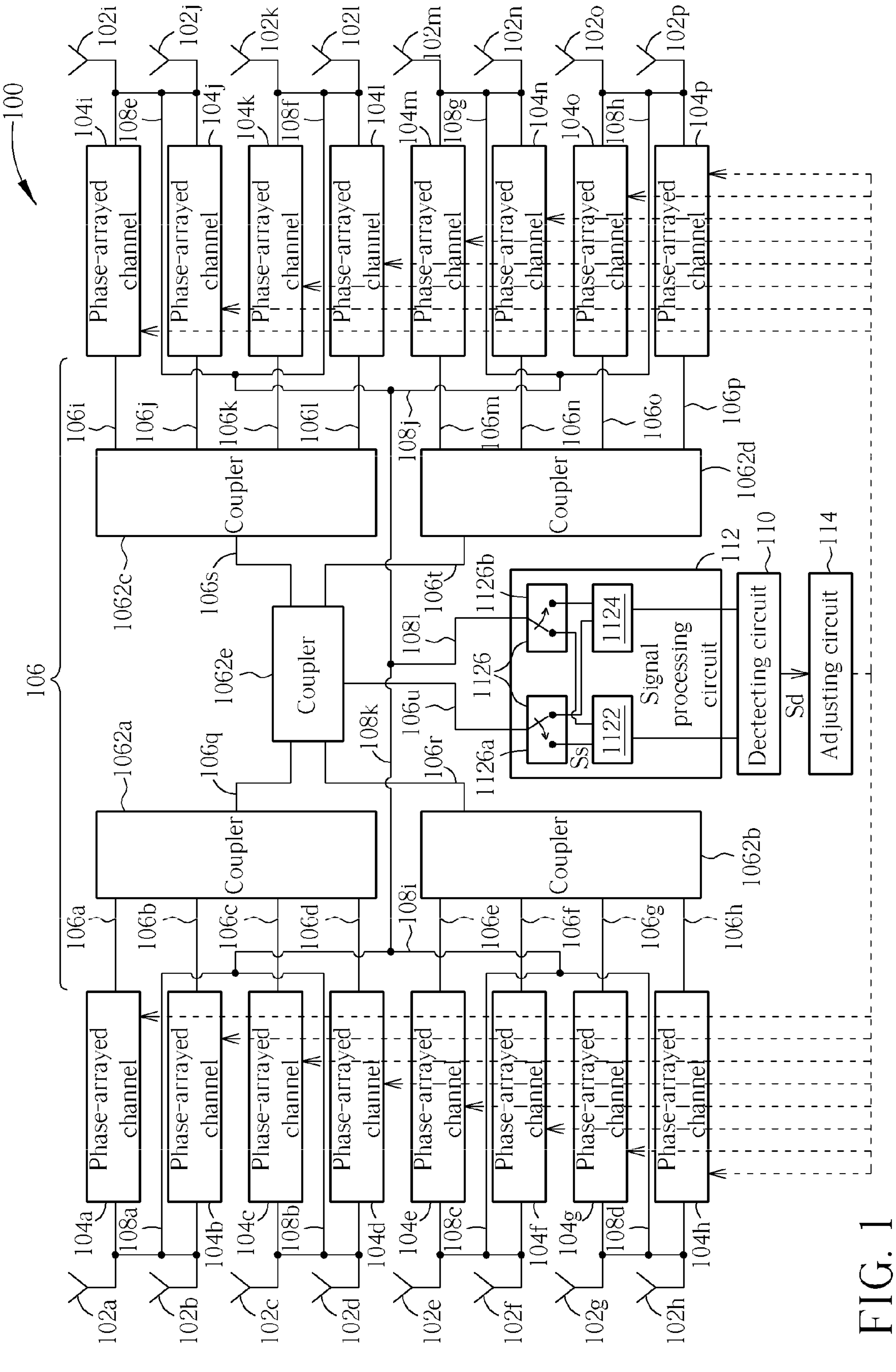
FIG. 1 is a diagram illustrating a phased-array device according to an embodiment of the present invention.

Please refer to FIG. 1, which is a diagram illustrating a phased-array device 100 according to an embodiment of the present invention. In this embodiment, the phased-array device 100 is a 16-channel phased-array transceiver, but this is not a limitation of the present invention. The phased-array device 100 comprises a plurality of antennas 102*a*-102*p*, a plurality of phase-arrayed channels 104*a*-104*p*, a first conducting circuit 106, a second conducting circuit 108 (which comprises 108*a*-108*l*), a detecting circuit 110, a signal processing circuit 112, and an adjusting circuit 114. The plurality of phase-arrayed channels 104*a*-104*p* is respectively coupled to the plurality of antennas 102*a*-102*p*. Each of the phase-arrayed channels 104*a*-104*p* comprises a transmitting circuit and a receiving circuit, wherein the transmitting circuit (e.g. the transmitting circuit of the phase-arrayed channel 104*a*) is utilized to transmit a signal having a relative phase to the corresponding antenna (e.g. the antenna 102*a*), and the receiving circuit (e.g. the receiving circuit of the phase-arrayed channel 104*a*) is utilized to receive a signal having a relative phase from the corresponding antenna (e.g. the antenna 102*a*).

The signal processing circuit 112 is arranged to generate a specific signal Ss. The first conducting circuit 106 comprises a plurality of conducting paths 106*a*-106*u*, and the plurality of conducting paths 106*a*-106*u* are arranged to conduct the specific signal Ss to the plurality of phase-arrayed channels 104*a*-104*p* respectively, wherein at least one of the plurality of phase-arrayed channels 104*a*-104*p* generates a phase-arrayed signal Ssp. The second conducting circuit 108 comprises a plurality of conducting paths 108*a*-108*l*, wherein the plurality of conducting paths 108*a*-108*l* are coupled between the plurality of phase-arrayed channels 104*a*-104*p* and the signal processing circuit 112 and arranged to conduct the phase-arrayed signal Ssp to the signal processing circuit 112. The plurality of conducting paths 108*a*-108*l* may also be the look-back loops of the plurality of phase-arrayed channels 104*a*-104*p* respectively.

The detecting circuit 110 is arranged to detect a mismatch between the phase-arrayed signal and a reference signal Sr to generate a detecting signal Sd utilized for calibrating at least one of the transmitting circuits and the receiving circuits. The adjusting circuit 114 is arranged to adjust at least one of the plurality of phase-arrayed channels 104*a*-104*p* according to the detecting signal.

In this embodiment, the first conducting circuit 106 further comprises five couplers 1062*a*-1062*e*. The coupler 1062*a* is utilized for combining the signals from the conducting paths 106*a*-106*d* and providing the combined signal to the conducting path 106*q*, or transmitting the signal from the conducting path 106*q* to the conducting paths 106*a*-106*d*. Similarly, the coupler 1062*b* is utilized for transferring the signals between the conducting paths 106*e*-106*h* and the conducting path 106*r*. The coupler 1062*c* is utilized for transferring the signals between the conducting paths 106*i*-106*l* and the conducting path 106*s*. The coupler 1062*d* is utilized for transferring the signals between the conducting paths 106*m*-106*p* and the conducting path 106*t*. In addition, the coupler 1062*e* is utilized for transferring the signals between the conducting paths 106*q*-106*t* and the conducting path 106*u*. Therefore, the conducting path 106*q* may be the shared partial conducting path of the conducting paths 106*a*-106*d*, the conducting path 106*r* may be the shared partial conducting path of the conducting paths 106*e*-106*h*, the conducting path 106*s* may be the shared partial conducting path of the conducting paths 106*i*-106*l*, and the conducting path 106*t* may be the shared partial conducting path of the conducting paths 106*m*-106*p*.

The signal processing circuit 112 comprises a transmitting signal processing circuit 1122, a receiving signal processing circuit 1124, and a switching circuit 1126. The switching circuit 1126 is arranged to selectively couple the transmitting signal processing circuit 1122 to the conducting path 106*u* or the conducting path 108*l*, and to selectively couple the receiving signal processing circuit 1124 to the conducting path 106*u* or the conducting path 108*l*. More specifically, the switching circuit 1126 comprises a first switch 1126*a* and a second switch 1126*b*, wherein the first switch 1126*a* is arranged to selectively couple the transmitting signal processing circuit 1122 to the conducting path 106*u* or the conducting path 108*l*, and the second switch 1126*b* is arranged to selectively couple the receiving signal processing circuit 1124 to the conducting path 106*u* or the conducting path 108*l*.

Figure 2:
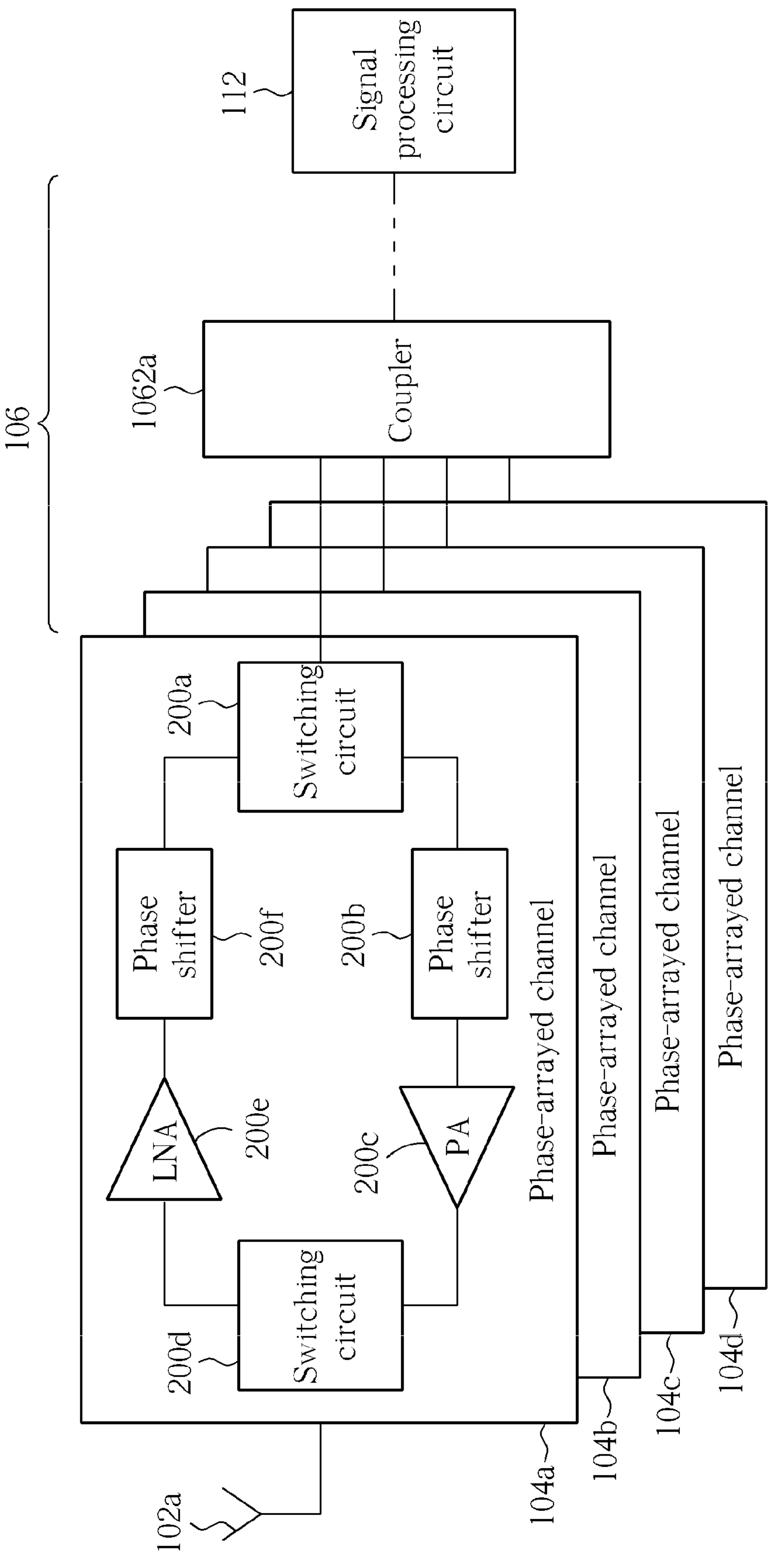
FIG. 2 is diagram illustrating a phase-arrayed channel according to an embodiment of the present invention.

Please refer to FIG. 2, which is a phase-arrayed channel according to an embodiment of the present invention. The phase-arrayed channel may be the embodiment of one phase-arrayed channel in the plurality of phase-arrayed channels 104*a*-104*p*. For brevity, the phase-arrayed channel is the phase-arrayed channel 104*a*. Please note that the antenna 102*a*, the phase-arrayed channels 104*b*, 104*c*, 104*d*, the coupler 1062*a*, the first conducting circuit 106, and the signal processing circuit 112 are also shown in FIG. 2 to more clearly illustrate the structure of the present embodiment. The phase-arrayed channel 104*a* comprises a switching circuit 200*a*, a phase shifter 200*b*, a power amplifier 200*c*, a switching circuit 200*d*, a low-noise amplifier (LNA) 200*e*, and a phase shifter 200*f*, wherein the switching circuit 200*d* may be a T/R (Transmitter/Receiver) switch, the phase shifter 200*b* in conjunction with the power amplifier (PA) 200*c* may be a transmitting circuit, and the low-noise amplifier 200*e* in conjunction with the phase shifter 200*f* may be a receiving circuit. When the phase-arrayed channel 104*a* operates under the transmitting mode, the switching 200*a* is controlled to connect the phase shifter 200*b* to the first conducting circuit 106 and disconnect the phase shifter 200*f* from the first conducting circuit 106, and the switching circuit 200*d* is controlled to connect the power amplifier 200*c* to the antenna 102*a* and disconnect the low-noise amplifier 200*e* from the antenna 102*a*. When the phase-arrayed channel 104*a* operates under the receiving mode, the switching 200*a* is controlled to disconnect the phase shifter 200*b* from the first conducting circuit 106 and connect the phase shifter 200*f* to the first conducting circuit 106, and the switching circuit 200*d* is controlled to disconnect the power amplifier 200*c* from the antenna 102*a* and connect the low-noise amplifier 200*e* to the antenna 102*a*

Figure 3:
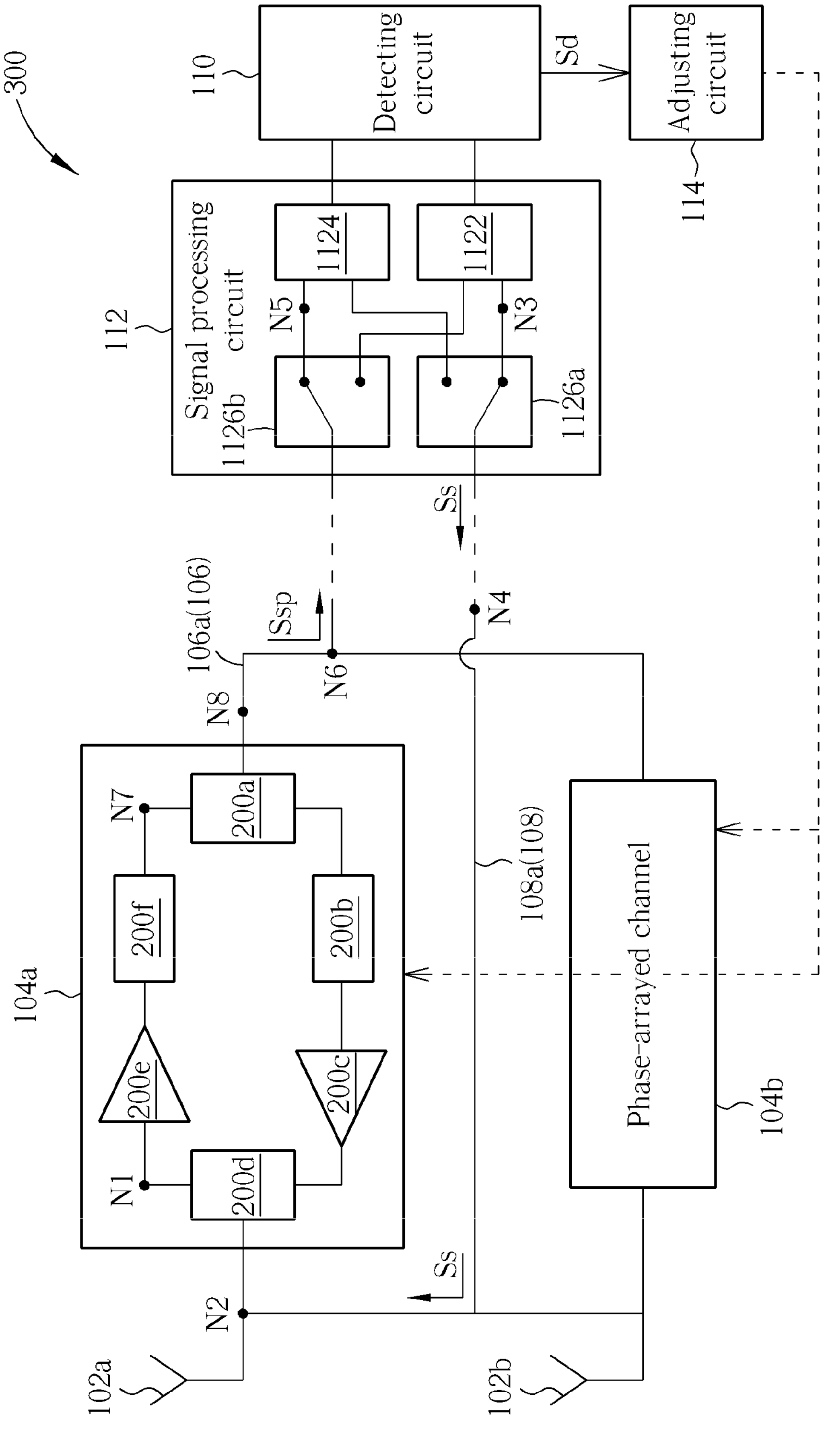
FIG. 3 is a diagram illustrating a partial circuit of the phased-array device shown in FIG. 1.

The operation of the phased-array device 100 is described in conjunction with FIG. 2 and FIG. 3. FIG. 3 is a diagram illustrating a partial circuit 300 of the phased-array device 100 shown in FIG. 1. The circuit in FIG. 3 comprises the antennas 102a, 102b, the phase-arrayed channels 104a, 104b, the first conducting circuit 106, the second conducting circuit 108, the detecting circuit 110, the signal processing circuit 112, and the adjusting circuit 114. In this embodiment, only the conducting path 106a of the first conducting circuit 106 and the conducting path 108a of the second conducting circuit 108 are shown in FIG. 3 for brevity.

When the phase-arrayed device 100 operates under a receiving signal calibrating mode as shown in FIG. 3, the switching circuit 200d is arranged to couple an input terminal N1 of the low-noise amplifier 200e of the receiving circuit to a first terminal N2 of the conducting path 108a, the switching circuit 1126 is arranged to couple an output terminal N3 of the transmitting signal processing circuit 1122 to a second terminal N4 of the conducting path 108a, and to couple an input terminal N5 of the receiving signal processing circuit 1124 to a first terminal N6 of the conducting path 106a. Furthermore, the switching circuit 200a is arranged to couple an output terminal N7 of the phase shifter 200f of the receiving circuit to a second terminal N8 of the conducting path 106a.

During the receiving signal calibrating mode, the signal processing circuit 112 is arranged to generate the specific signal Ss to the conducting path 108a. The conducting path 108a is arranged to conduct the specific signal Ss to the input terminal N1 of the low-noise amplifier 200e. The receiving circuit is arranged to provide the phase-arrayed signal Ssp at the output terminal N7 of the phase shifter 200f according to the specific signal Ss. The conducting path 106a is arranged to conduct the phase-arrayed signal Ssp to the signal processing circuit 112. The detecting circuit 110 is then arranged to detect a mismatch between the phase-arrayed signal Ssp and the reference signal Sr to generate the detecting signal Sd utilized for calibrating the phase-arrayed signal Ssp. The adjusting circuit 114 is then arranged to adjust the low-noise amplifier 200e and/or the phase shifter 200f of the receiving circuit to make the phase-arrayed signal Ssp have a phase component that is substantially equal to a phase component of the reference signal Sr, and/or have an amplitude component that is substantially equal to an amplitude component of the reference signal Sr.

Accordingly, the phase-arrayed signal Ssp in response to the receiving circuit of each of the other phase-arrayed channels (i.e. 104b-104p) can be adjusted to have the phase component substantially equal the phase component of the reference signal Sr, and/or have the amplitude component substantially equal the amplitude component of the reference signal Sr. It should be noted that the lengths of the conducting paths utilized for conducting the specific signal Ss from the transmitting signal processing circuit 1122 to the receiving circuits of the plurality of phase-arrayed channels 104a-104p are substantially the same as each other, and the lengths of the conducting paths utilized for conducting the phase-arrayed signal Ssp from the receiving circuits of the plurality of phase-arrayed channels 104a-104p to the receiving signal processing circuit 1124 are substantially the same as each other as shown in FIG. 1.

Figure 4:
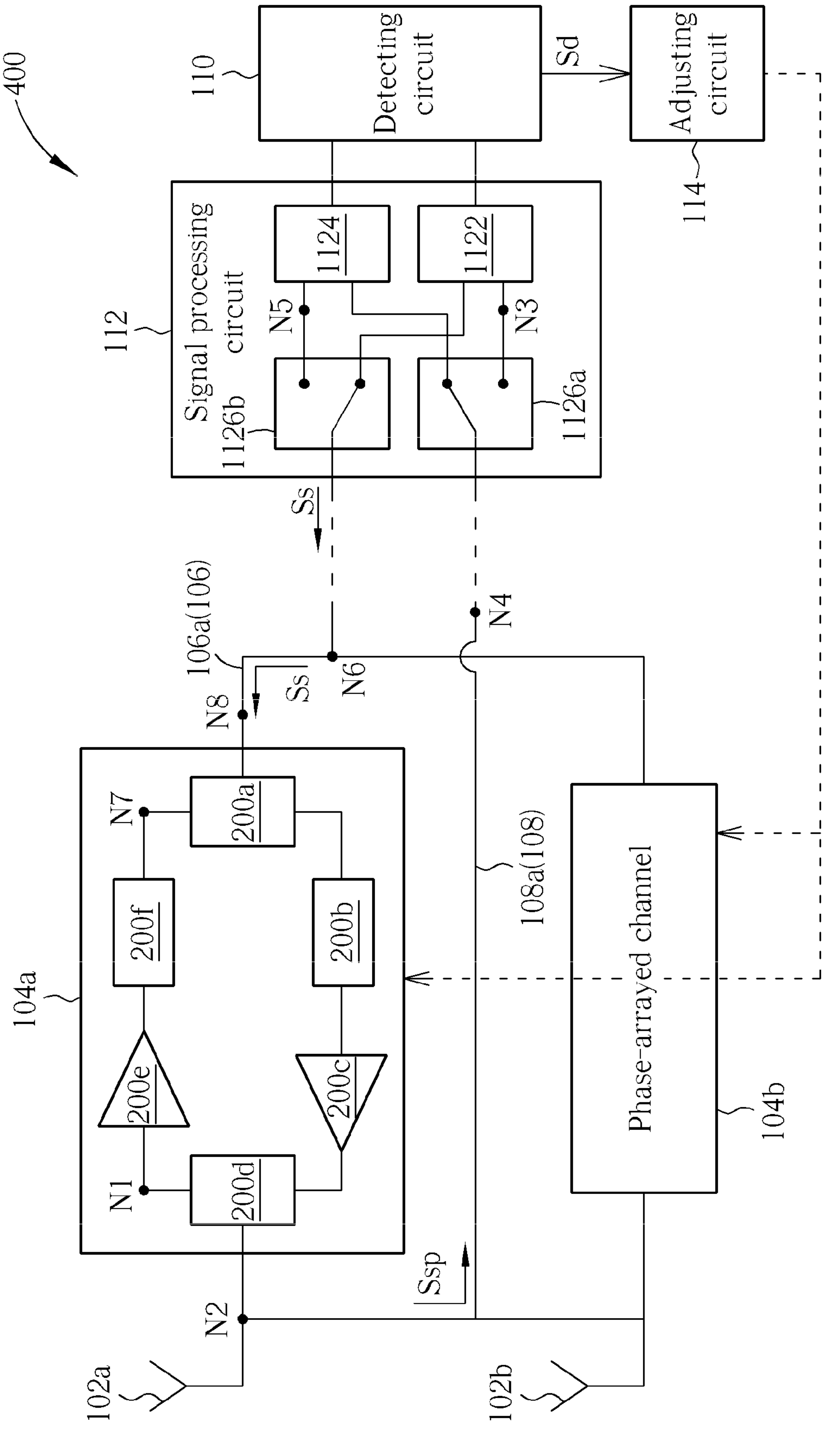
FIG. 4 is a diagram illustrating a phased-array device operating under a transmitting signal calibrating mode according to an embodiment of the present invention.

Please refer to FIG. 4, which is a diagram illustrating the phased-array device 100 operating under a transmitting signal calibrating mode. When the phase-arrayed device 100 operates under the transmitting signal calibrating mode, the switching circuit 200d is arranged to couple an output terminal N10 of the power amplifier 200c of the transmitting circuit to the first terminal N2 of the conducting path 108a, and the switching circuit 1126 is arranged to couple the output terminal N3 of the transmitting signal processing circuit 1122 to the first terminal N6 of the conducting path 106, and to couple the input terminal N5 of the receiving signal processing circuit 1124 to the second terminal N4 of the first conducting path 108a. Furthermore, the switching circuit 200a is arranged to couple an input terminal N9 of the phase shifter 200b of the transmitting circuit to the second terminal N8 of the conducting path 106a.

During the transmitting signal calibrating mode, the signal processing circuit 112 is arranged to generate the specific signal Ss to the conducting path 106a. The conducting path 106a is arranged to conduct the specific signal Ss to the input terminal N9 of the phase shifter 200b. The transmitting circuit is arranged to provide the phase-arrayed signal Ssp at the output terminal N10 of the power amplifier 200c according to the specific signal Ss. The conducting path 108a is arranged to conduct the phase-arrayed signal Ssp to the signal processing circuit 112. The detecting circuit 110 is then arranged to detect a mismatch between the phase-arrayed signal Ssp and the reference signal Sr to generate the detecting signal Sd utilized for calibrating the phase-arrayed signal Ssp. The adjusting circuit 114 is then arranged to adjust the phase shifter 200b and/or the power amplifier 200c of the transmitting circuit to make the phase-arrayed signal Ssp have a phase component that is substantially equal to a phase component of the reference signal Sr, and/or have an amplitude component that is substantially equal to an amplitude component of the reference signal Sr.

Accordingly, the phase-arrayed signal Ssp in response to the transmitting circuit of each of the other phase-arrayed channels (i.e. 104b-104p) can be adjusted to have the phase component substantially equal the phase component of the reference signal Sr, and/or have the amplitude component substantially equal the amplitude component of the reference signal Sr. It should be noted that the lengths of the conducting paths utilized for conducting the specific signal Ss from the transmitting signal processing circuit 1122 to the transmitting circuits of the plurality of phase-arrayed channels 104a-104p are substantially the same as each other, and the lengths of the conducting paths utilized for conducting the phase-arrayed signal Ssp from the transmitting circuits of the plurality of phase-arrayed channels 104a-104p to the receiving signal processing circuit 1124 are substantially the same as each other as shown in FIG. 1.

It should be noted that the above-mentioned reference signal Sr may be a predetermined signal generated by the signal processing circuit 112. In a situation where the reference signal Sr is the predetermined signal generated by the signal processing circuit 112, the plurality of phase-arrayed channels 104a-104p may be calibrated to make the phase-arrayed signals in response to the plurality of phase-arrayed channels 104a-104p respectively equal the phase component and/or the amplitude component of the reference signal Sr.

In addition, the above-mentioned reference signal Sr may also be a phase-arrayed signal in response to one phase-arrayed channel among the phase-arrayed channels 104a-104p. In a situation where the reference signal Sr is the phase-arrayed signal in response to one phase-arrayed channel among the phase-arrayed channels 104a-104p, during the receiving signal calibrating mode, the signal processing circuit 112 is first arranged to generate the specific signal Ss the receiving circuit of one phase-arrayed channel among the phase-arrayed channels 104a-104p, and then the phase-arrayed signal Ssp generated by the phase-arrayed channel is received by the signal processing circuit 112. The signal processing circuit 112 will therefore regard the received phase-arrayed signal Ssp as the reference signal Sr. For example, if the phase-arrayed channel utilized for generating the reference signal Sr is the first phase-arrayed channel 104a during the receiving signal calibrating mode, the switching circuit 200*d* is arranged to couple the input terminal N1 of the low-noise amplifier 200*e* of the receiving circuit to the first terminal N2 of the conducting path 108*a*, the switching circuit 1126 is arranged to couple an output terminal N3 of the transmitting signal processing circuit 1122 to the second terminal N4 of the conducting path 108*a*, and to couple the input terminal N5 of the receiving signal processing circuit 1124 to the first terminal N6 of the conducting path 106*a*. Furthermore, the switching circuit 200*a* is arranged to couple the output terminal N7 of the phase shifter 200*f* of the receiving circuit to the second terminal N8 of the conducting path 106*a*.

The signal processing circuit 112 is arranged to generate the specific signal Ss to the conducting path 108*a*. The conducting path 108*a* is arranged to conduct the specific signal Ss to the input terminal N1 of the low-noise amplifier 200*e*. The receiving circuit is arranged to provide the phase-arrayed signal Ssp at the output terminal N7 of the phase shifter 200*f* according to the specific signal Ss. The conducting path 106*a* is arranged to conduct the phase-arrayed signal Ssp to the signal processing circuit 112. The signal processing circuit 112 therefore regards the received phase-arrayed signal Ssp as the reference signal Sr.

Similarly, if the phase-arrayed channel utilized for generating the reference signal Sr is the first phase-arrayed channel 104*a* during the transmitting signal calibrating mode, the switching circuit 200*d* is arranged to couple the output terminal N10 of the power amplifier 200*c* of the transmitting circuit to the first terminal N2 of the conducting path 108*a*, and the switching circuit 1126 is arranged to couple the output terminal N3 of the transmitting signal processing circuit 1122 to the first terminal N6 of the conducting path 106, and to couple the input terminal N5 of the receiving signal processing circuit 1124 to the second terminal N4 of the first conducting path 108*a*. Furthermore, the switching circuit 200*a* is arranged to couple the input terminal N9 of the phase shifter 200*b* of the transmitting circuit to the second terminal N8 of the conducting path 106*a*.

The signal processing circuit 112 is arranged to generate the specific signal Ss to the conducting path 106*a*. The conducting path 106*a* is arranged to conduct the specific signal Ss to the input terminal N9 of the phase shifter 200*b*. The transmitting circuit is arranged to provide the phase-arrayed signal Ssp at the output terminal N10 of the power amplifier 200c according to the specific signal Ss. The conducting path 108*a* is arranged to conduct the phase-arrayed signal Ssp to the signal processing circuit 112. The signal processing circuit 112 therefore regards the received phase-arrayed signal Ssp as the reference signal Sr.

It should be noted that the present invention is not limited to adjusting the phase-arrayed channel to make the phase-arrayed signal Ssp in response to one phase-arrayed channel have a phase component substantially equal the phase component of the reference signal Sr, and/or have an amplitude component substantially equal the amplitude component of the reference signal Sr. In another embodiment of the present invention, the signal processing circuit 112 may be arranged to adjust the specific signal Ss according to the detecting signal Sd to make the phase-arrayed signal Ssp have a phase component that is substantially equal to the phase component of the reference signal Sr, and/or have an amplitude component that is substantially equal to the amplitude component of the reference signal Sr. In other words, in another embodiment, the adjusting circuit 114 connecting to the plurality of phase-arrayed channels 104*a*-104*p* can be omitted.

It should also be noted that the arrangement of the second conducting circuit 108 (i.e. the plurality of conducting paths 108*a*-108*l*) is for transmitting signals (i.e. the specific signal Ss or the phase-arrayed signal Ssp) during the receiving signal calibrating mode and the transmitting signal calibrating mode; therefore, the second conducting circuit 108 may not be arranged to conduct the specific signal Ss to the plurality of phase-arrayed channels during the normal receiving mode of the phase-arrayed device 100, and/or may not be arranged to conduct the phase-arrayed signal Ssp to the signal processing circuit 112 during the normal transmitting mode of the phase-arrayed device 100.

Figure 5:
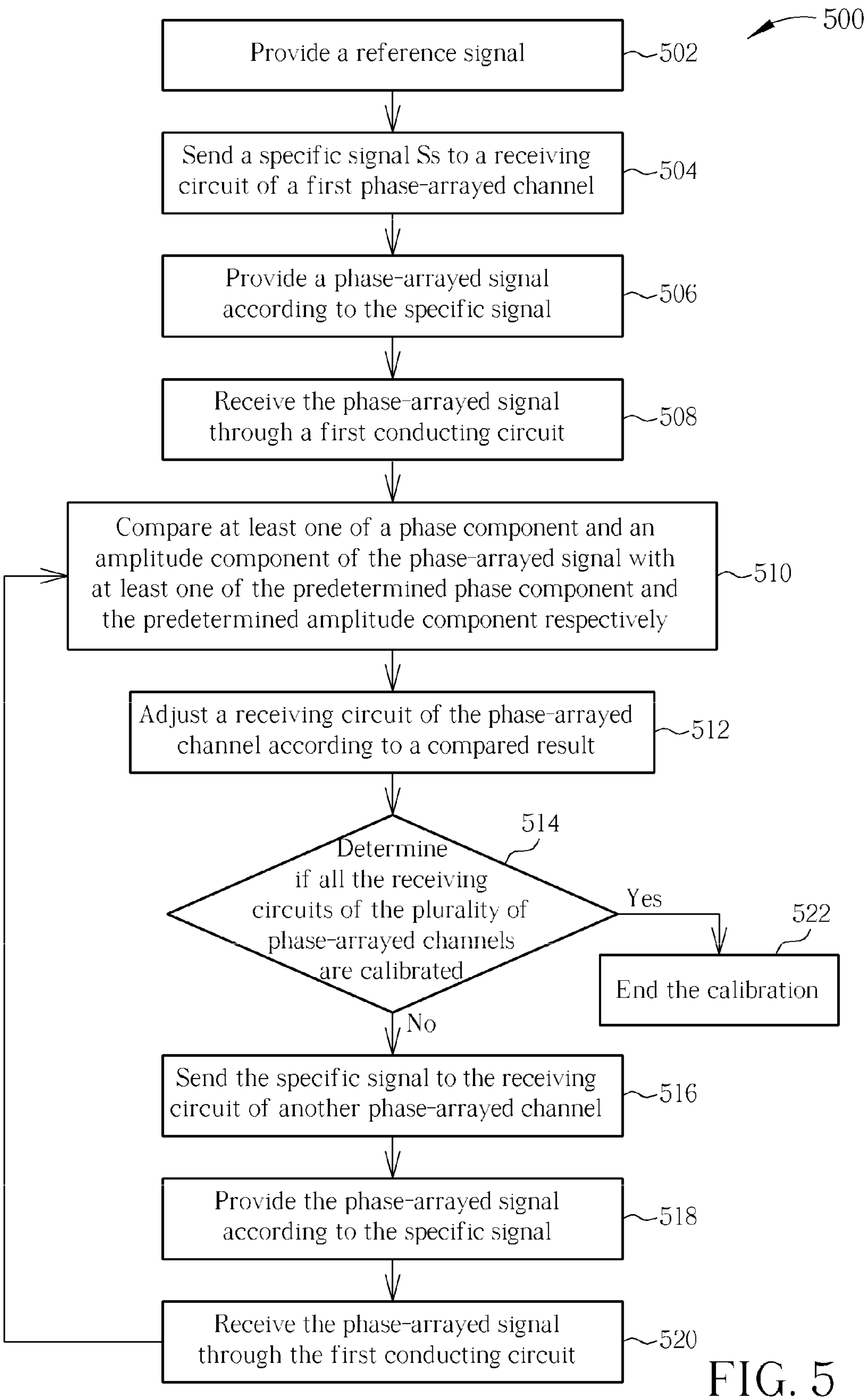
FIG. 5 is a flowchart illustrating a method for calibrating a phase-arrayed device according to an embodiment of the present invention.

Please refer to FIG. 5, which is a flowchart illustrating a method 500 for calibrating a phase-arrayed device according to an embodiment of the present invention. The method 500 may be the above-mentioned method utilized for calibrating the phase-arrayed device 100 during the receiving signal calibrating mode. Therefore, the description of the method 500 may also refer to FIG. 1 and FIG. 3. Provided that substantially the same result is achieved, the steps of the flowchart shown in FIG. 5 need not be in the exact order shown and need not be contiguous; that is, other steps can be intermediate. The method comprises:

Step 502: Provide the reference signal Sr having a predetermined phase component and a predetermined amplitude component;

Step 504: Send the specific signal Ss to the receiving circuit of the first phase-arrayed channel (e.g. 104*a*) through the second conducting circuit 108 (e.g. the conducting paths 108*l*, 108*k*, 108*i*, and 108*a*);

Step 506: Provide the phase-arrayed signal Ssp according to the specific signal Ss;

Step 508: Receive the phase-arrayed signal Ssp through the first conducting circuit 106 (e.g. the conducting paths 106*a*, 106*q*, and 106*u*);

Step 510: Compare at least one of a phase component and an amplitude component of the phase-arrayed signal Ssp with at least one of the predetermined phase component and the predetermined amplitude component, respectively, to generate a compared result Sc;

Step 512: Adjust the receiving circuit of the phase-arrayed channel (e.g. the gain of the receiving circuit of the phase-arrayed channel 104*a*) such that at least one of the phase component and the amplitude component of the phase-arrayed signal Ssp substantially equal at least one of the predetermined phase component and the predetermined amplitude component, respectively, according to the compared result Sc;

Step 514: Determine if all the receiving circuits of the plurality of phase-arrayed channels 104*a*-104*p* are calibrated; if no, go to step 516, if yes, go to step 522;

Step 516: Send the specific signal Ss to the receiving circuit of another phase-arrayed channel through the second conducting circuit 108;

Step 518: Provide the phase-arrayed signal Ssp according to the specific signal Ss;

Step 520: Receive the phase-arrayed signal Ssp through the first conducting circuit 106 and go to step 510;

Step 522: End the calibration.

In this embodiment, the reference signal Sr is a predetermined reference signal having the predetermined phase component and the predetermined amplitude component. In step 510, the detecting circuit 110 compares at least one of the phase component and the amplitude component of the phase-arrayed signal Ssp with at least one of the predetermined phase component and the predetermined amplitude component, respectively, to generate the compared result Sc, then the detecting circuit 110 generates the detecting signal Sd according to the compared result Sc.

In step 512, the adjusting circuit 114 adjusts the receiving circuit of the phase-arrayed channel such that at least one of the phase component and the amplitude component of the phase-arrayed signal Ssp substantially equal at least one of the predetermined phase component and the predetermined amplitude component, respectively, according to the detecting signal Sd. In step 514, the signal processing circuit 112 determines if all the receiving circuits of the plurality of phase-arrayed channels 104*a*-104*p* are calibrated to make their phase-arrayed signals substantially equal the reference signal Sr. If they do not, the steps 510-520 will be repeated until all the phase-arrayed signals substantially equal the reference signal Sr (i.e. step 522).

Figure 6:
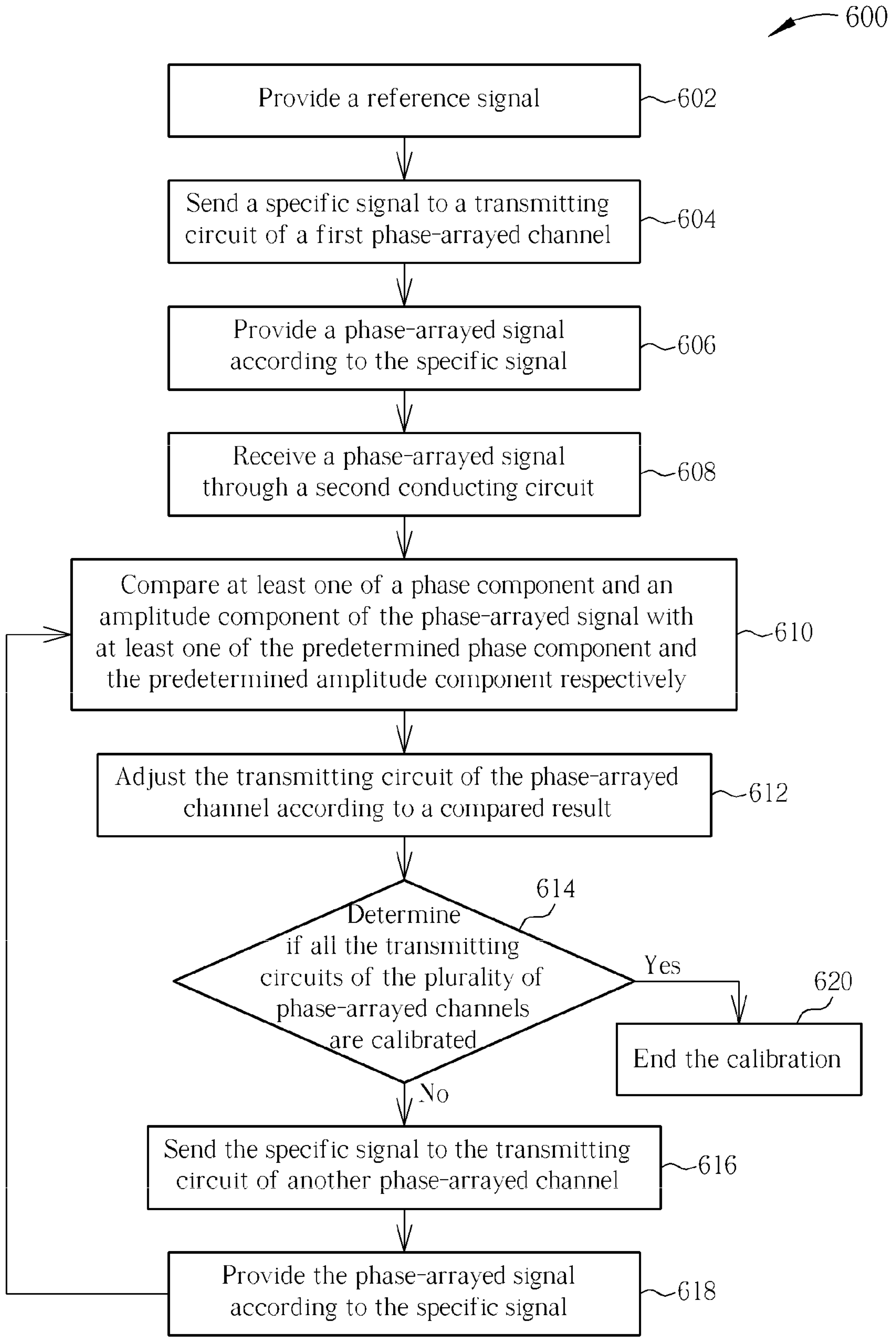
FIG. 6 is a flowchart illustrating a method for calibrating a phase-arrayed device according to an embodiment of the present invention.

Please refer to FIG. 6, which is a flowchart illustrating a method 600 for calibrating a phase-arrayed device according to an embodiment of the present invention. The method 600 may be the above-mentioned method utilized for calibrating the phase-arrayed device 100 during the transmitting signal calibrating mode. Therefore, the description of the method 600 may also refer to FIG. 1 and FIG. 4. Provided that substantially the same result is achieved, the steps of the flowchart shown in FIG. 6 need not be in the exact order shown and need not be contiguous; that is, other steps can be intermediate. The method comprises:

Step 602: Provide the reference signal Sr having a predetermined phase component and a predetermined amplitude component;

Step 604: Send the specific signal Ss to the transmitting circuit of the first phase-arrayed channel (e.g. 104*a*) through the first conducting circuit 106 (e.g. the conducting paths 106*u*, 106*q*, and 106*a*);

Step 606: Provide the phase-arrayed signal Ssp according to the specific signal Ss;

Step 608: Receive the phase-arrayed signal Ssp through the second conducting circuit 108 (e.g. the conducting paths 108*a*, 108*i*, 108*k*, and 108*l*);

Step 610: Compare at least one of a phase component and an amplitude component of the phase-arrayed signal Ssp with at least one of the predetermined phase component and the predetermined amplitude component, respectively, to generate a compared result Sc;

Step 612: Adjust the transmitting circuit of the phase-arrayed channel (e.g. the gain of the transmitting circuit of the phase-arrayed channel 104*a*) such that at least one of the phase component and the amplitude component of the phase-arrayed signal Ssp substantially equal at least one of the predetermined phase component and the predetermined amplitude component, respectively, according to the compared result Sc;

Step 614: Determine if all the transmitting circuits of the plurality of phase-arrayed channels 104*a*-104*p* are calibrated; if no, go to step 616, if yes, go to step 622;

Step 616: Send the specific signal Ss to the transmitting circuit of another phase-arrayed channel through the first conducting circuit 106;

Step 618: Provide the phase-arrayed signal Ssp according to the specific signal Ss and go to step 608;

Step 620: End the calibration.

In this embodiment, the reference signal Sr is a predetermined reference signal having the predetermined phase component and the predetermined amplitude component. In step 610, the detecting circuit 110 compares at least one of the phase component and the amplitude component of the phase-arrayed signal Ssp with at least one of the predetermined phase component and the predetermined amplitude component, respectively, to generate the compared result Sc, then the detecting circuit 110 generates the detecting signal Sd according to the compared result Sc.

In step 612, the adjusting circuit 114 adjusts the transmitting circuit of the phase-arrayed channel such that at least one of the phase component and the amplitude component of the phase-arrayed signal Ssp substantially equal at least one of the predetermined phase component and the predetermined amplitude component, respectively, according to the detecting signal Sd. In step 614, the signal processing circuit 112 determines if all the transmitting circuits of the plurality of phase-arrayed channels 104*a*-104*p* are calibrated to make their phase-arrayed signals substantially equal the reference signal Sr. If they do not, the steps 608-618 will be repeated until all the phase-arrayed signals substantially equal the reference signal Sr (i.e. step 620).

Figure 7:
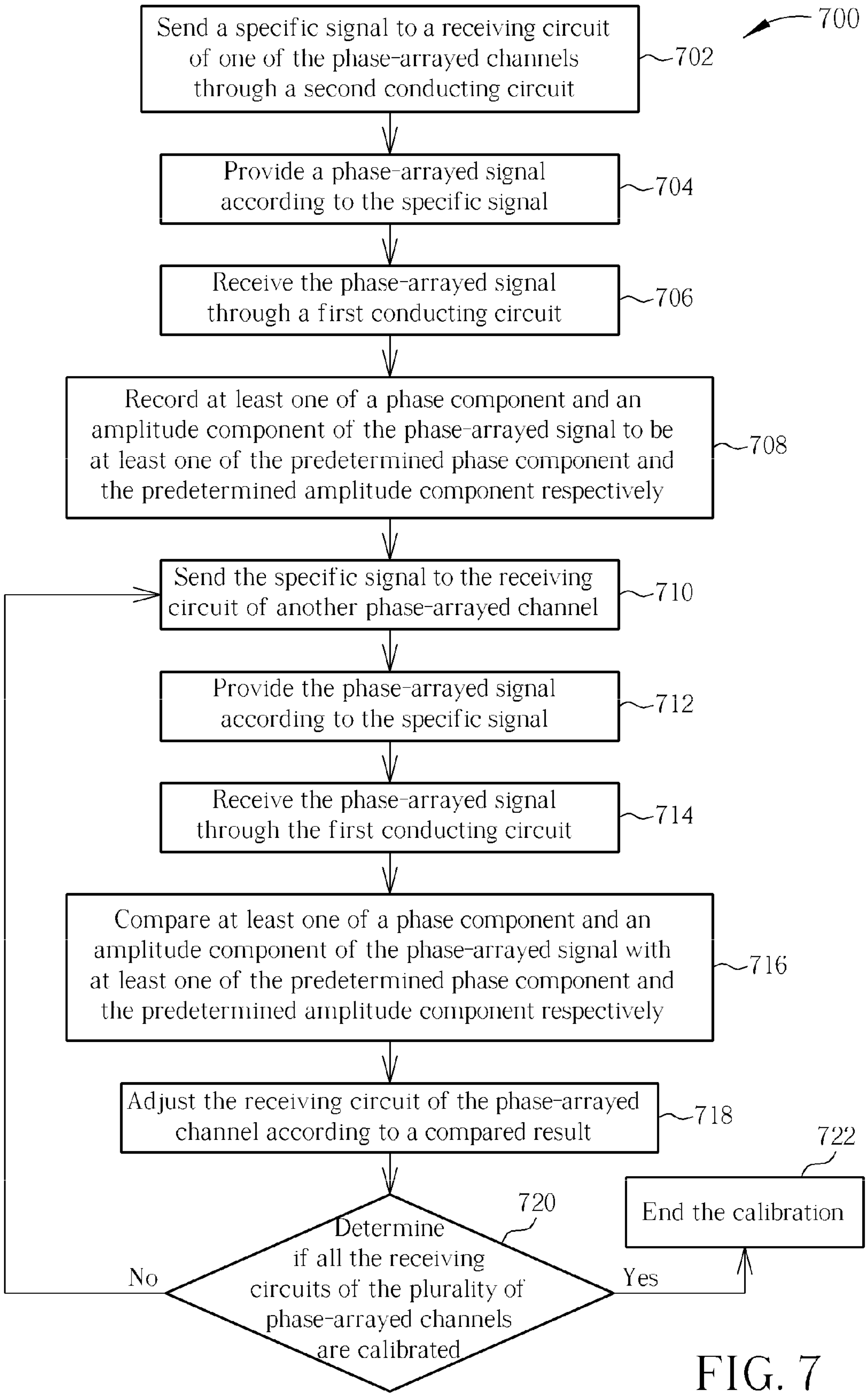
FIG. 7 is a flowchart illustrating a method for calibrating a phase-arrayed device according to an embodiment of the present invention.

Please refer to FIG. 7, which is a flowchart illustrating a method 700 for calibrating a phase-arrayed device according to an embodiment of the present invention. The method 700 may be the above-mentioned method utilized for calibrating the phase-arrayed device 100 during the receiving signal calibrating mode. Therefore, the description of the method 700 may also refer to FIG. 1 and FIG. 3. Provided that substantially the same result is achieved, the steps of the flowchart shown in FIG. 7 need not be in the exact order shown and need not be contiguous; that is, other steps can be intermediate. The method comprises:

Step 702: Send the specific signal Ss to the receiving circuit of one of the phase-arrayed channels (e.g. 104*a*) through the second conducting circuit 108 (e.g. the conducting paths 108*l*, 108*k*, 108*i*, and 108*a*);

Step 704: Provide the phase-arrayed signal Ssp according to the specific signal Ss;

Step 706: Receive the phase-arrayed signal Ssp through the first conducting circuit 106 (e.g. the conducting paths 106*a*, 106*q*, and 106*u*);

Step 708: Record at least one of a phase component and an amplitude component of the phase-arrayed signal Ssp to be at least one of the predetermined phase component and the predetermined amplitude component, respectively;

Step 710: Send the specific signal Ss to the receiving circuit of another phase-arrayed channel (e.g. 104*b*) through the second conducting circuit 108 (e.g. the conducting paths 108*l*, 108*k*, 108*i*, and 108*a*);

Step 712: Provide the phase-arrayed signal Ssp according to the specific signal Ss;

Step 714: Receive the phase-arrayed signal Ssp through the first conducting circuit 106 (e.g. the conducting paths 106*b*, 106*q*, and 106*u*);

Step 716: Compare at least one of a phase component and an amplitude component of the phase-arrayed signal Ssp with at least one of the predetermined phase component and the predetermined amplitude component, respectively, to generate a compared result Sc;

Step 718: Adjust the receiving circuit of the phase-arrayed channel (e.g. the gain of the receiving circuit of the phase-arrayed channel 104*b*) such that at least one of the phase component and the amplitude component of the phase-arrayed signal Ssp substantially equal at least one of the predetermined phase component and the predetermined amplitude component respectively according to the compared result Sc;

Step 720: Determine if all the receiving circuits of the plurality of phase-arrayed channels except for the phase-arrayed channel used in step 702 are calibrated; if no, go to step 710, if yes, go to step 722;

Step 722: End the calibration.

In this embodiment, the reference signal Sr is set as the phase-arrayed signal Ssp received in step 708. In step 716, the detecting circuit 110 compares at least one of the phase component and the amplitude component of the phase-arrayed signal Ssp with at least one of the predetermined phase component and the predetermined amplitude component, respectively, to generate the compared result Sc, then the detecting circuit 110 generates the detecting signal Sd according to the compared result Sc.

In step 718, the adjusting circuit 114 adjusts the receiving circuit of the phase-arrayed channel such that at least one of the phase component and the amplitude component of the phase-arrayed signal Ssp substantially equal at least one of the predetermined phase component and the predetermined amplitude component, respectively, according to the detecting signal Sd. In step 720, the signal processing circuit 112 determines if all the receiving circuits of the plurality of phase-arrayed channels except for the phase-arrayed channel used in step 702 are calibrated to make their phase-arrayed signals substantially equal the phase-arrayed channel obtained in step 706. If they do not, the steps 710-720 will be repeated until all the phase-arrayed signals substantially equal the reference signal Sr (i.e. step 722).

Figure 8:
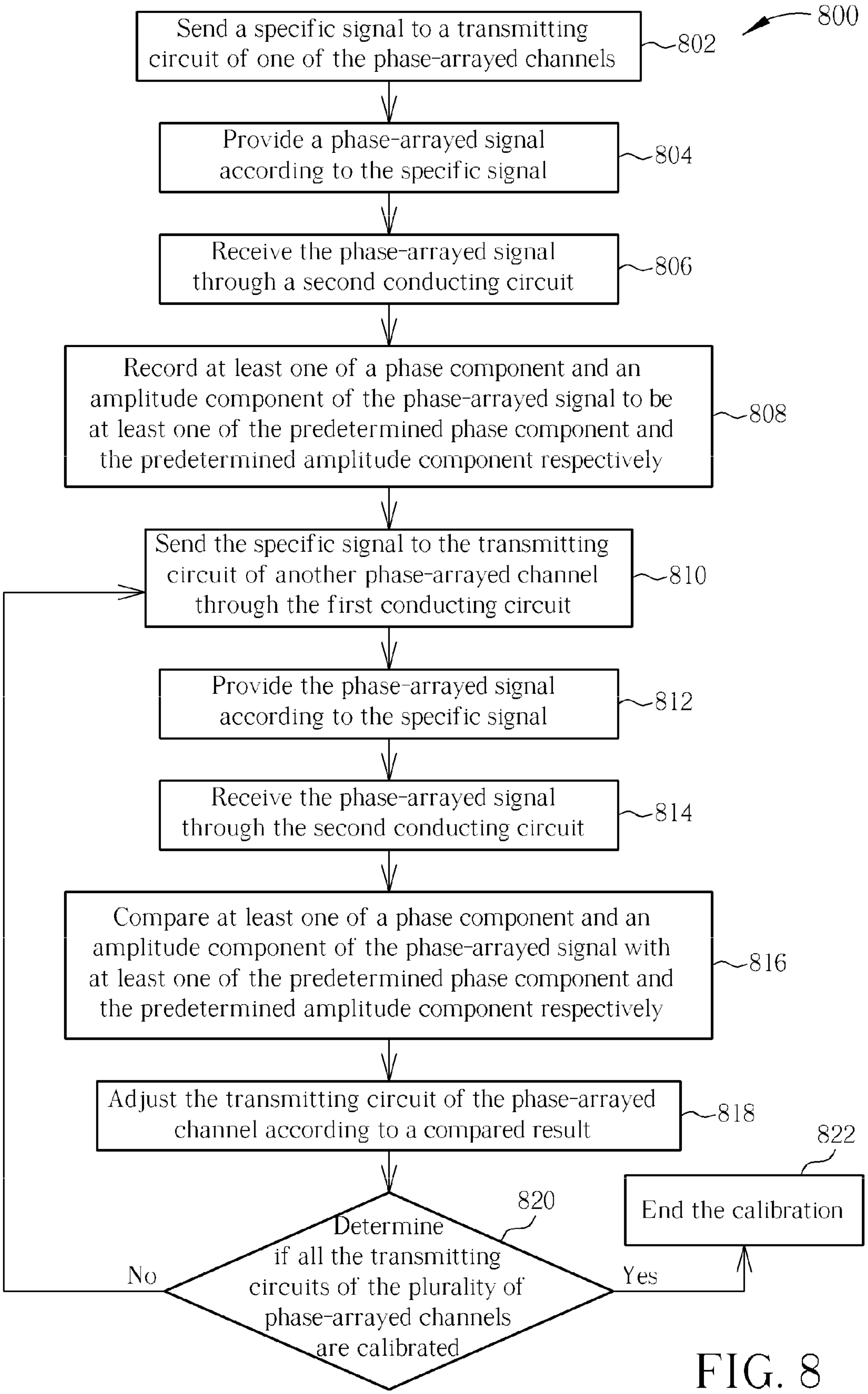
FIG. 8 is a flowchart illustrating a method for calibrating a phase-arrayed device according to an embodiment of the present invention.

Please refer to FIG. 8, which is a flowchart illustrating a method 800 for calibrating a phase-arrayed device according to an embodiment of the present invention. The method 800 may be the above-mentioned method utilized for calibrating the phase-arrayed device 100 during the transmitting signal calibrating mode. Therefore, the description of the method 800 may also refer to FIG. 1 and FIG. 4. Provided that substantially the same result is achieved, the steps of the flowchart shown in FIG. 8 need not be in the exact order shown and need not be contiguous; that is, other steps can be intermediate. The method comprises:

Step 802: Send the specific signal Ss to the transmitting circuit of one of the phase-arrayed channels (e.g. 104*a*) through the first conducting circuit 106 (e.g. the conducting paths 106*u*, 106*q*, and 106*a*);

Step 804: Provide the phase-arrayed signal Ssp according to the specific signal Ss;

Step 806: Receive the phase-arrayed signal Ssp through the second conducting circuit 108 (e.g. the conducting paths 108*a*, 108*i*, 108*k*, and 108*l*);

Step 808: Record at least one of a phase component and an amplitude component of the phase-arrayed signal Ssp to be at least one of the predetermined phase component and the predetermined amplitude component, respectively;

Step 810: Send the specific signal Ss to the transmitting circuit of another phase-arrayed channel (e.g. 104*b*) through the first conducting circuit 106 (e.g. the conducting paths 106*u*, 106*q*, and 106*b*);

Step 812: Provide the phase-arrayed signal Ssp according to the specific signal Ss;

Step 814: Receive the phase-arrayed signal Ssp through the second conducting circuit 108 (e.g. the conducting paths 108*a*, 108*i*, 108*k*, and 108*l*);

Step 816: Compare at least one of a phase component and an amplitude component of the phase-arrayed signal Ssp with at least one of the predetermined phase component and the predetermined amplitude component, respectively, to generate a compared result Sc;

Step 818: Adjust the transmitting circuit of the phase-arrayed channel (e.g. the gain of the transmitting circuit of the phase-arrayed channel 104*b*) such that at least one of the phase component and the amplitude component of the phase-arrayed signal Ssp substantially equal at least one of the predetermined phase component and the predetermined amplitude component, respectively, according to the compared result Sc;

Step 820: Determine if all the transmitting circuits of the plurality of phase-arrayed channels except for the phase-arrayed channel used in step 802 are calibrated; if no, go to step 810, if yes, go to step 822;

Step 822: End the calibration.

In this embodiment, the reference signal Sr is set as the phase-arrayed signal Ssp received in step 808. In step 816, the detecting circuit 110 compares at least one of the phase component and the amplitude component of the phase-arrayed signal Ssp with at least one of the predetermined phase component and the predetermined amplitude component, respectively, to generate the compared result Sc, then the detecting circuit 110 generates the detecting signal Sd according to the compared result Sc.

In step 818, the adjusting circuit 114 adjusts the transmitting circuit of the phase-arrayed channel such that at least one of the phase component and the amplitude component of the phase-arrayed signal Ssp substantially equal at least one of the predetermined phase component and the predetermined amplitude component, respectively, according to the detecting signal Sd. In step 820, the signal processing circuit 112 determines if all the transmitting circuits of the plurality of phase-arrayed channels except for the phase-arrayed channel used in step 802 are calibrated to make their phase-arrayed signals substantially equal the phase-arrayed channel obtained in step 806. If they do not, the steps 810-820 will be repeated until all the phase-arrayed signals substantially equal the reference signal Sr (i.e. step 822).

Briefly, the present embodiment(s) provide a look-back loop (i.e. the second conducting circuit) for the phase-arrayed device to transmit the specific signal or the phase-arrayed signal utilized for detecting and compensating the mismatches between the phase-arrayed channels. As the present calibrating circuit(s) is embedded with the phase-arrayed device, the phase-arrayed device does not take up an excess area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phase-arrayed device, comprising:

a signal processing circuit, arranged to generate a specific signal;

a first phase-arrayed channel, arranged to provide a first phase-arrayed signal according to the specific signal;

a first conducting path, arranged to conduct the specific signal to the first phase-arrayed channel;

a second conducting path, arranged to conduct the first phase-arrayed signal to the signal processing circuit; and a detecting circuit, arranged to detect a mismatch between the first phase-arrayed signal and a reference signal to generate a detecting signal utilized for calibrating the first phase-arrayed signal;

wherein the first phase-arrayed channel comprises:

a transmitting circuit;

a receiving circuit; and a first switching circuit, arranged to selectively couple the transmitting circuit or the receiving circuit to the first conducting path; and the signal processing circuit comprises:

a transmitting signal processing circuit;

a receiving signal processing circuit; and a second switching circuit, arranged to selectively couple the transmitting signal processing circuit to the first conducting path or the second conducting path, and to selectively couple the receiving signal processing circuit to the first conducting path or the second conducting path.

2. The phase-arrayed device of claim 1, wherein the signal processing circuit is further arranged to generate a predetermined signal to act as the reference signal.

3. The phase-arrayed device of claim 1, further comprising:

a second phase-arrayed channel, arranged to provide a second phase-arrayed signal according to the specific signal;

a third conducting path, arranged to conduct the specific signal to the second phase-arrayed channel; and a fourth conducting path, arranged to conduct the second phase-arrayed signal to the signal processing circuit to act as the reference signal.

4. The phase-arrayed device of claim 3, wherein the first conducting path and the third conducting path share a partial conducting path, and the second conducting path and the fourth conducting path share a partial conducting path.

5. The phase-arrayed device of claim 3, wherein the first conducting path and the third conducting path are equal in length, and the second conducting path and the fourth conducting path are equal in length.

6. The phase-arrayed device of claim 1, further comprising:

an adjusting circuit, arranged to adjust the receiving circuit according to the detecting signal;

wherein when the phase-arrayed device operates under a receiving signal calibrating mode, the first switching circuit is arranged to couple an input terminal of the receiving circuit to a first terminal of the first conducting path, the second switching circuit is arranged to couple an output terminal of the transmitting signal processing circuit to a second terminal of the first conducting path, and to couple an input terminal of the receiving signal processing circuit to the second conducting path, and the adjusting circuit is arranged to adjust the receiving circuit to make the first phase-arrayed signal have a phase component that is substantially equal to a phase component of the reference signal, or have an amplitude component that is substantially equal to an amplitude component of the reference signal.

7. The phase-arrayed device of claim 1, further comprising:

an adjusting circuit, arranged to adjust the transmitting circuit according to the detecting signal;

wherein when the phase-arrayed device operates under a transmitting signal calibrating mode, the first switching circuit is arranged to couple an output terminal of the transmitting circuit to a first terminal of the first conducting path, the second switching circuit is arranged to couple an output terminal of the transmitting signal processing circuit to a first terminal of the second conducting path, and to couple an input terminal of the receiving signal processing circuit to a second terminal of the first conducting path, and the adjusting circuit is arranged to adjust the transmitting circuit to make the first phase-arrayed signal have a phase component that is substantially equal to a phase component of the reference signal, or have an amplitude component that is substantially equal to an amplitude component of the reference signal.

8. The phase-arrayed device of claim 1, further comprising:

an adjusting circuit, arranged to adjust the first phase-arrayed channel according to the detecting signal;

wherein the adjusting circuit is arranged to adjust the first phase-arrayed channel to make the first phase-arrayed signal have a phase component that is substantially equal to a phase component of the reference signal, or have an amplitude component that is substantially equal to an amplitude component of the reference signal.

9. The phase-arrayed device of claim 1, wherein the signal processing circuit is further arranged to adjust the specific signal according to the detecting signal, and the signal processing circuit is arranged to adjust the specific signal to make the first phase-arrayed signal have a phase component that is substantially equal to a phase component of the reference signal, or have an amplitude component that is substantially equal to an amplitude component of the reference signal.

10. The phase-arrayed device of claim 1, wherein when the phase-arrayed device operates under a normal transmitting mode, the second conducting path is not arranged to conduct the first phase-arrayed signal to the signal processing circuit.

11. The phase-arrayed device of claim 1, wherein when the phase-arrayed device operates under a normal receiving mode, the first conducting path is not arranged to conduct the specific signal to the first phase-arrayed channel.

12. A phase-arrayed device, comprising:

a signal processing circuit, arranged to generate a specific signal;

a plurality of phase-arrayed channels, each having a transmitting circuit and a receiving circuit;

a plurality of first conducting circuits, arranged to conduct the specific signal to the plurality of phase-arrayed channels respectively, wherein at least one of the plurality of phase-arrayed channels generates a phase-arrayed signal;

a plurality of second conducting circuits, coupled to the plurality of phase-arrayed channels respectively and arranged to conduct the phase-arrayed signal to the signal processing circuit; and a detecting circuit, arranged to detect a mismatch between the phase-arrayed signal and a reference signal to generate a detecting signal utilized for calibrating at least one of the transmitting circuits and the receiving circuits;

wherein at least one of the phase-arrayed channels further comprises:

a first switching circuit, arranged to selectively couple the transmitting circuit or the receiving circuit to a corresponding first conducting path; and the signal processing circuit comprises:

a transmitting signal processing circuit;

a receiving signal processing circuit; and a second switching circuit, arranged to selectively couple the transmitting signal processing circuit to the corresponding first conducting path or a corresponding second conducting path, and to selectively couple the receiving signal processing circuit to the corresponding first conducting path or the corresponding second conducting path.

13. A method for calibrating a phase-arrayed device, comprising:

sending a specific signal to a first phase-arrayed channel of a plurality of phase-arrayed channels to provide a first phase-arrayed signal;

receiving the first phase-arrayed signal through a first conducting path;

comparing at least one of a first phase component and a first amplitude component of the first phase-arrayed signal with at least one of a predetermined phase component and a predetermined amplitude component respectively to generate a compared result;

adjusting a gain of the first phase-arrayed channel such that at least one of the first phase component and the first amplitude component of the first phase-arrayed signal substantially equal at least one of the predetermined phase component and the predetermined amplitude component respectively according to the compared result;

sending the specific signal to a second phase-arrayed channel of the plurality of phase-arrayed channels to provide a second phase-arrayed signal;

receiving the second phase-arrayed signal through a second conducting path; and recording at least one of a second phase component and a second amplitude component of the second phase-arrayed signal to be at least one of the predetermined phase component and the predetermined amplitude component respectively;

wherein the specific signal is sent to the first phase-arrayed channel through a third conducting path, the specific signal is sent to the second phase-arrayed channel through a fourth conducting path, and the first conducting path and the second conducting path share a partial conducting path, and the third conducting path and the fourth conducting path share a partial conducting path.

14. The method of claim 13, wherein the first phase-arrayed channel is different from the second phase-arrayed channel.

15. The method of claim 13, wherein the first phase-arrayed channel comprises a transmitting circuit of the phase-arrayed device, and the transmitting circuit receives the specific signal to provide the first phase-arrayed signal, and when the transmitting circuit of the phase-arrayed device operates under a normal transmitting mode, the first conducting path is not arranged to conduct the first phase-arrayed signal provided by the transmitting circuit.

16. A phase-arrayed device, comprising:

a signal processing circuit, arranged to generate a specific signal;

a first phase-arrayed channel, arranged to provide a first phase-arrayed signal according to the specific signal;

a first conducting path, arranged to conduct the specific signal to the first phase-arrayed channel;

a second conducting path, arranged to conduct the first phase-arrayed signal to the signal processing circuit;

a detecting circuit, arranged to detect a mismatch between the first phase-arrayed signal and a reference signal to generate a detecting signal utilized for calibrating the first phase-arrayed signal;

a second phase-arrayed channel, arranged to provide a second phase-arrayed signal according to the specific signal;

a third conducting path, arranged to conduct the specific signal to the second phase-arrayed channel; and a fourth conducting path, arranged to conduct the second phase-arrayed signal to the signal processing circuit to act as the reference signal;

wherein the first conducting path and the third conducting path share a partial conducting path, and the second conducting path and the fourth conducting path share a partial conducting path.

* * * * *